Sept. 19, 1967 J. J. NYBERG 3,343,136

DATA PROCESSING TIMING APPARATUS

Filed Aug. 17, 1964

INVENTOR
JAMES J. NYBERG
BY Arthur F. Freilich

ATTORNEY

United States Patent Office 3,343,136
Patented Sept. 19, 1967

3,343,136

DATA PROCESSING TIMING APPARATUS

James J. Nyberg, Chesterfield, Mo., assignor to The Bunker-Ramo Corporation, Canoga Park, Calif., a corporation of Delaware Filed Aug. 17, 1964, Ser. No. 389,959
9 Claims. (Cl. 340—172.5)

ABSTRACT OF THE DISCLOSURE

A circuit arrangement useful in a data processing apparatus for selectively introducing variable delays by inhibiting the application of an appropriate number of clock pulses to the logic circuits of the apparatus. The circuit arrangement includes a delay counter which is set to a count corresponding to the duration of the delay to be introduced. The counter controls a gate coupling a clock pulse source to the logic circuits by disabling the gate for so long as the counter stores a non-zero count. The counter is decremented in response to each clock pulse.

This invention relates generally to data processing apparatus including digital computers and more particularly to improvements in the timing means used therein.

Commonly used data processing apparatus is often of the synchronous type in which information signals are developed in response to the generation of a clock pulse. The clock pulses are usually provided by some free-running source. Operations performed by the apparatus are usually comprised of a series of steps each of which is performed in response to a clock pulse and usually in response to a previous step. Thus, for example, a first address can be entered into a memory address register and a corresponding word can be accessed from memory in response to a first clock pulse. The accessed word can then be transferred to a first register in response to a second clock pulse. A second address can be entered into the memory address register in response to a third clock pulse and in response to a fourth clock pulse the second word accessed from memory can be transferred to a second register.

In the foregoing exemplary sequence, it can be seen that each succeeding step can be performed in response to each succeeding clock pulse. It is sometimes necessary, however, to introduce a time delay after certain steps and prior to the performance of the succeeding step. For example, assume that the outputs of the previously mentioned first and second registers are constantly coupled to an adder circuit. Inasmuch as the adder circuits may require more than one clock period in order to fully add two words in parallel, the sum of the words stored in the registers by the fourth clock pulse may not be available for transfer to another register until after the six clock pulse, therefore necessitating the introduction of some time delay.

Many other reasons exist for selectively introducing time delays in the course of operating a data processing system. For example, when a digital computer communicates with relatively slow input/output devices, the computer may have to wait a fixed length of time after placing a data word on its output lines before sending a signal that the data is available. This delay assures that variations in amplifier rise time cannot cause data to be transmitted incorrectly. It should be appreciated that the length of delay which must be introduced in each situation is not necessarily the same and is dependent upon the reason for introducing the delay. Thus, it is usually necessary to provide means in data processing equipment for selectively introducing each of a plurality of different delays. One straightforward solution to introducing each different delay is to utilize a plurality of multivibrators each of which has an unstable period whose duration is equal to a different one of the necessary delays. The multivibrators can be connected to the data processing equipment so as to effectively inhibit the application of the clock pulses thereto while any of the multivibrators are set. The principal objection to introducing delays in this manner is that as many different multivibrators are required as there are different delays to be introduced. Moreover, because of the necessary relationship between the multivibrators, they would have to be very stringently designed in order to possess the necessary degree of timing tolerance.

In view of the foregoing, it is an object of the present invention to provide an improved means for selectively introducing different length time delays in data processing equipment.

Briefly, the present invention is based upon the realization that the operation of a data processing apparatus can be most effectively and economically delayed by inhibiting the application of clock pulses thereto for the period of the desired delay. Thus, clock pulses can be applied to the data processing apparatus through a normally enabled gate which is disabled during the delay period. The gate can be disabled by the non-zero output of a counter which can be set to any one of a plurality of different counts by the data processing apparatus when a delay is to be introduced. During the period that the gate is disabled, the clock pulses are used to decrement the counter.

As is appreciated by those skilled in the art, the decision to introduce a delay is often dependent upon the results of a specific previous operational step. The results of the specific step normally would not be available for use until the clock pulse succeeding the step occurs and thus it would normally take still another clock pulse to initiate the delay. It would be desirable, of course, to avoid the necessity of waiting for this additional clock pulse. Thus, as a feature of the present invention, a one clock pulse delay means is always set on the clock pulse prior to the clock pulse on which it may be required to initiate a delay. The circuit output representing the results of the specific step is then gated directly with the output of the one clock pulse delay means to thereby inhibit the application of the succeeding clock pulse to the data processing apparatus in the event a delay is in fact to be introduced.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
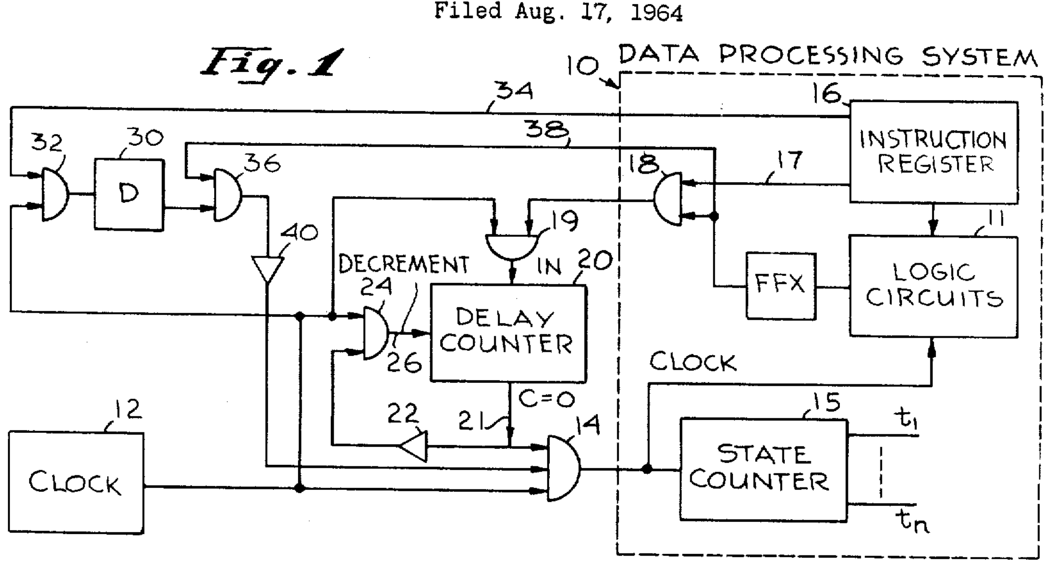
FIGURE 1 is a logical block diagram of a data processing system used in conjunction with apparatus in accordance with the present invention.

Attention is now called to FIGURE 1 which illustrates a data processing system 10 utilizing timing apparatus in accordance with the present invention. The system 10 generally includes a plurality of logic circuits 11 which perform operations in response to clock pulses serially provided by a free running clock source 12. In accordance with the invention, the output of the clock pulse source 12 is coupled to the input of an AND gate 14 whose output is coupled to the logic circuits 11 and to a state counter 15. When the AND gate 14 is enabled, each pulse provided by the clock pulse source 12 is coupled to the logic circuits and increments state counter 15. As previously pointed out, it is sometimes necessary to introduce time delays in the operation of the data processing circuits, and, in accordance with the invention, these time delays are introduced by disabling AND gate 14 for the duration of the desired time delay.

Figure 2:
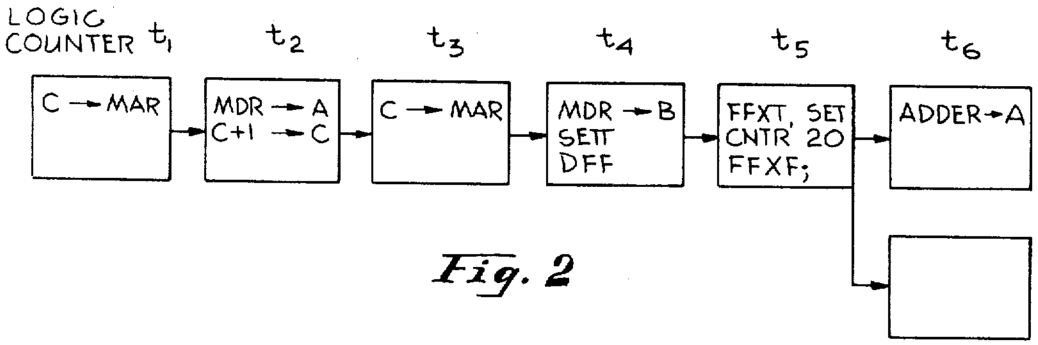
FIGURE 2 is an exemplary flow chart.
Figure 3:
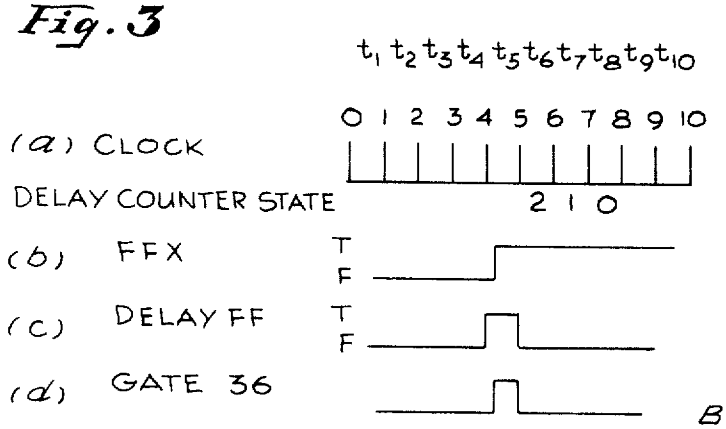
FIGURE 3 is a timing chart tending to illustrate a feature of the invention.

More particularly, in the normal course of operation of the system 10, the logic circuits perform operations in response to the contents of the state counter 15 and instruction register 16. As is readily appreciated by those skilled in the art, these operations typically include accessing information from and storing information in a memory (not shown), transferring information between registers (not shown), and performing arithmetic and logical operations. As an illustration, consider the flow chart shown in FIGURE 2 which represents an exemplary sequence in which words stored in adjacent locations of a memory are accessed and added if a delay control signal is provided. The delay control signal is provided when the state of a flip-flop FFX is true. The flow chart consists of instructions which are sequentially entered into the instruction register 16 during different states of the state counter 15. FIGURE 2 can be considered in conjunction with the timing chart of FIGURE 3.

Thus, in response to a clock pulse 0, the state counter is switched to state $t_1$ and an instruction is stored in register 16 calling for the C register (not shown) to transfer its contents to a memory address register (not shown) and for the memory to be accessed to thereby enter the word from the identified location into the memory data register (not shown). Clock pulse 1 switches the state counter to state $t_2$ thereby transferring the contents of the memory data register into the A register (not shown) and incrementing the C counter. Clock pulse 3 subsequently switches the state counter to state $t_3$ to thereby transfer the incremented contents of the C register to the memory address register. Clock pulse 4 causes state $t_4$ to be defined which thus loads the B register (not shown) with the word from the identified memory location. The outputs of the A and B registers can be continually applied to the input of an adder circuit. Let it be assumed that whenever a flip-flop FFX defines a true state, the output of the adder is to be transferred to the A register. Inasmuch as it often requires several clock periods for the adder to provide the sum of A and B, it is desired to selectively introduce a time delay of a predetermined duration prior to transferring the adder output to the A register. Thus let it be assumed that during state $t_5$, an instruction identifying the duration of the delay is entered into the register 16. In accordance with the invention, in response to this instruction, a delay will be introduced prior to the definition of state $t_6$ during which the adder output will be coupled to the A register.

The instruction in the register 16 during state $t_5$ defines the duration of the delay to be introduced in terms of a number of clock pulses. Thus, assume a three clock pulse delay is desired, register 16 will provide signals on conductor 17, which will be passed by AND gate 18, if enabled by flip-flop FFX, to the input of AND gate 19. The output of gate 19, which is enabled in response to a clock pulse, is connected to the input of a delay counter 20 capable of defining a plurality of different counts. Thus the signals provided on conductor 17 can force the delay counter to the defined count, herein two. The counter 20 is provided with an output terminal 21 which is made logically false whenever the counter defines any count other than zero. The output terminal 21 is connected to the input of AND gate 14.

The counter output terminal 21 is also connected through an inverter 22 to the input of an AND gate 24 whose output is connected to a decrementing input terminal 26 of the counter 20. The output of the clock pulse source 12 is also connected to the input of the AND gate 24.

In order to appreciate the operation of the apparatus thus far described, let it be assumed that the clock pulse source 12 provides a clock pulse once each microsecond and that the counter 20 is forced to a non-zero count of two. Thus, the counter will continue to define a non-zero count for a two microsecond duration thereby disabling the AND gate 14 and preventing clock pulses provided by source 12 from being coupled to the logic circuits and state counter. When a logically false signal is applied to the counter output terminal 21, the AND gate 24 is enabled to thus apply the pulses provided by the clock pulse source 12 to the decrementing input terminal 26 of the counter 20. Thus, each succeeding pulse provided by the clock pulse source 12 will not be applied to the logic circuits 11 but instead will be applied to decrement the counter 20. Accordingly, after two microseconds, that is, after two pulses have been applied through AND gate 24 to the counter terminal 26, the counter will again define a zero state to thus enable AND gate 14 and disable AND gate 24. In this manner, any one of a plurality of different time delays can be introduced in the operation of the data processing apparatus without requiring the provision of a plurality of different multivibrator circuits.

As a practical matter, oftentimes the decision that a delay should be introduced is based on information which is not available until after the generation of the clock pulse immediately preceding the first clock pulse to be inhibited. Consider the waveforms shown in FIGURE 3. Note that flip-flop FFX may go true in response to clock pulse 4 where it is desired to prevent the application of clock pulse 5 to the logic circuits. It is assumed that if flip-flop FFX is false at clock pulse 5, then it is unnecessary and undesirable to introduce a delay. Inasmuch as delay counter 20 is switched only in response to a clock pulse, where flip-flop FFX does not switch until after clock pulse 4, the counter cannot prevent clock pulse 5 from being passed by AND gate 14.

In order to avoid the application of clock pulse 5 to the logic circuits, a delay flip-flop 30 is provided which is set by an AND gate 32 on the clock pulse preceding the clock pulse on which it may be desired to initiate a delay; that is, in response to the instruction in register 16 during state $t_4$. More particularly, where it is desired to introduce a delay immediately after flip-flop FFX is set true and where flip-flop FFX can be but need not necessarily be set true in response to clock pulse 4, the delay flip-flop 30 is set true in response to clock pulse 4. On clock pulse 4, the instruction register 16 therefore provides a logically true signal on output terminal 34 which sets the delay flip-flop 30. Thus, the output of the delay flip-flop is true in the interval between clock pulses 4 and 5. The output of the delay flip-flop 30 is coupled to the input of an AND gate 36 which also has an input derived on line 38 from the output of flip-flop FFX. Thus, the AND gate 36 will provide a true output signal only if flop-flop FFX provides a true output signal between clock pulses 4 and 5. The output of AND gate 36 is connected through an inverter 40 to the input of the AND gate 14. Thus, if the AND gate 36 provides a true output signal, the gate 14 will be disabled prior to clock pulse 5 thereby initiating the delay prior to clock pulse 5 as is desired. The subsequent clock pulse provided by the source 12 resets the delay flip-flop 30 in the absence of a true signal being provided on output terminal 34.

In response to clock pulse 5, as noted, the delay counter 20 will be forced to the predetermined count, herein two. In response to the clock pulses 6 and 7, the counter 20 will be decremented. Clock pulse 8 will then be passed by gate 14 and thus establish state $t_6$ during which state the adder output can be coupled to the A register.

From the foregoing, it should be appreciated that means have been provided herein for use in conjunction with data processing apparatus for enabling different length delays to be accurately and selectively introduced. Moreover, it has been demonstrated how the delays can be initiated immediately after the condition determining that the delay is to be introduced is established, rather than after the succeeding clock pulse is applied to the logic circuits. It should further be appreciated that the references made herein to a zero count do not contemplate any particular configuration of the counter but rather to any arbitrarily chosen reference state.

The embodiments of the invention in which an exclusive property or privilege is claimed are defined as follows:

1. In combination with a data processing system including a source of successive clock pulses and a plurality of logic circuits responsive to said successive clock pulses for performing a series of operations, means introducing a selected time delay between operations, said means including:
- a delay counter;
- means in said data processing system for setting said delay counter to a predetermined count;
- gating means for coupling said source of successive clock pulses to said logic circuits;
- means responsive to a non-zero count in said delay counter for disabling said gating means; and
- means responsive to each of said succesive clock pulses for decrementing said delay counter toward zero when it defines a non-zero count.

2. In a data processing system including a free-running source of clock pulses and a plurality of logic circuits respectively responsive thereto, means for normally applying said pulses to said logic circuits and for selectively inhibiting their application for selected durations, said means including:
- a delay counter capable of defining a plurality of different counts;
- means for setting said delay counter to a predetermined count; and
- means responsive to said delay counter defining a zero count for applying said clock pulses to said logic circuits and responsive to said delay counter defining a non-zero count for inhibiting the application of said clock pulses to said logic circuits.

3. The system of claim 2 including means for decrementing said delay counter in response to each clock pulse when said counter defines a non-zero count.

4. In a data processing system including a free-running source of clock pulses and a plurality of logic circuits respectively responsive thereto, means for normally applying said pulses to said logic circuits and for selectively inhibiting their application for selected durations, said means including:
- a delay counter capable of defining a plurality of different counts;
- means responsive to said logic circuits for selectively providing a delay control signal;
- means responsive to the provision of said delay control signal and the immediately subsequent clock pulse for setting said delay counter to a predetermined count; and
- means responsive to said delay counter defining a zero count for applying said clock pulses to said logic circuits and responsive to said delay counter defining a non-zero count for inhibiting the application of said clock pulses to said logic circuits.

5. The system of claim 4 including means responsive to the provision of said delay control signal for inhibiting the application of said immediately subsequent clock pulse to said logic circuits.

6. The system of claim 5 wherein said last named means includes a flip-flop capable of defining first and second states;
- means for switching said flip-flop to said second state in response to the clock pulse immediately preceding the possible provision of said delay control signal; and
- gating circuit means responsive to said flip-flop defining said second state and said provision of said delay control signal.

7. In a data processing system in which operational steps are performed in sequence, each step being specified by an instruction and being performed in response to a clock pulse provided by a free-running source, means responsive to certain instructions for introducing a time delay prior to the performance of a succeeding step, said means including:
- a delay counter capable of defining a plurality of different counts;
- gating means for coupling said free-running source to said data processing system;
- each of said certain instructions defining a delay count;
- means responsive to each of said certain instructions for driving said delay counter to said defined delay count;
- means responsive to said delay counter defining a non-zero count for inhibiting said gating means; and
- means responsive to each of said clock pulses provided by said free running source for decrementing said delay counter when it defines a non-zero count.

8. In a data processing system in which operational steps are performed in sequence, each step being specified by an instruction and being performed in response to a clock pulse provided by a free-running source, means responsive to certain instructions for introducing a time delay prior to the performance of a succeeding step, said means including:
- a delay counter capable of defining a plurality of different counts;
- gating means for coupling said free-running source to said data processing system;
- each of said certain instructions defining a delay count;
- means in said data processing system for generating a delay control signal;
- means responsive to the generation of said delay control signal and to each of said certain instructions for driving said delay counter to said defined delay count;
- means responsive to said delay counter defining a non-zero count for inhibiting said gating means; and
- means responsive to each of said clock pulses provided by said free-running source for decrementing said delay counter when it defines a non-zero count.

9. The system of claim 8 including a flip-flop capable of defining first and second states;
- means responsive to a clock pulse occurring immediately prior to the generation of said delay control signal for switching said flip-flop to said second state;
- means responsive to the generation of said delay control signal and to said flip-flop defining said second state for inhibiting said gating means; and
- means responsive to a clock pulse occurring immediately subsequent to the generation of said delay control signal for switching said flip-flop to said first state.

References Cited

UNITED STATES PATENTS 3,061,192 10/1962 Terzian.

ROBERT C. BAILEY, *Primary Examiner.*

G. D. SHAW, *Assistant Examiner.*